US011961282B2

(12) United States Patent
Price et al.

(10) Patent No.: US 11,961,282 B2
(45) Date of Patent: Apr. 16, 2024

(54) METHODS AND SYSTEMS FOR DETECTING DEEPFAKES

(71) Applicant: ZeroFOX, Inc., Baltimore, MD (US)

(72) Inventors: Michael Morgan Price, Baltimore, MD (US); Matthew Alan Price, Baltimore, MD (US)

(73) Assignee: ZeroFOX, Inc, Baltimore, MD (US)

( * ) Notice: Subject to any disclaimer, the term of this patent is extended or adjusted under 35 U.S.C. 154(b) by 396 days.

(21) Appl. No.: 17/155,319

(22) Filed: Jan. 22, 2021

(65) Prior Publication Data

US 2021/0142065 A1 May 13, 2021

Related U.S. Application Data

(62) Division of application No. 16/689,580, filed on Nov. 20, 2019, now Pat. No. 10,929,677.

(60) Provisional application No. 62/883,957, filed on Aug. 7, 2019.

(51) Int. Cl.
  *G06V 20/40* (2022.01)
  *G06F 18/214* (2023.01)
  *G06V 10/774* (2022.01)
  *G06V 40/16* (2022.01)

(52) U.S. Cl.
  CPC ........ *G06V 10/7747* (2022.01); *G06F 18/214* (2023.01); *G06V 20/41* (2022.01); *G06V 20/46* (2022.01); *G06V 40/171* (2022.01)

(58) Field of Classification Search
  None
  See application file for complete search history.

(56) References Cited

U.S. PATENT DOCUMENTS

| | | | |
|---|---|---|---|
| 7,024,033 B2 | 4/2006 | Li et al. | |
| 8,259,806 B2 | 9/2012 | Radhakrishnan et al. | |
| 8,416,332 B2 * | 4/2013 | Sato | H04N 21/4314 348/333.05 |
| 8,457,391 B2 * | 6/2013 | Ai | G06V 10/7747 382/305 |
| 8,467,611 B2 | 6/2013 | Kumar et al. | |
| 9,436,876 B1 | 9/2016 | Carlson et al. | |
| 9,514,536 B2 | 12/2016 | Rafati et al. | |
| 9,665,784 B2 | 5/2017 | Derakhshani et al. | |
| 10,417,501 B2 | 9/2019 | Ashour et al. | |
| 10,517,521 B2 * | 12/2019 | el Kaliouby | A61B 5/0261 |
| 10,546,183 B2 * | 1/2020 | Rodriguez | G06V 40/45 |

(Continued)

*Primary Examiner* — Tsung Yin Tsai
(74) *Attorney, Agent, or Firm* — DLA PIPER LLP (US)

(57) ABSTRACT

A system for detecting synthetic videos may include a server, a plurality of weak classifiers, and a strong classifier. The server may be configured to receive a prediction result from each of a plurality of weak classifiers; and send the prediction results from each of the plurality of weak classifiers to a strong classifier. The weak classifiers may be trained on real videos and known synthetic videos to analyze a distinct characteristic of a video file; detect irregularities of the distinct characteristic; generate a prediction result associated with the distinct characteristic, the prediction result being a prediction on whether the video file is synthetic; and output the prediction result to the server. The strong classifier may be trained to receive the prediction results of the plurality of weak classifiers from the server; analyze the prediction results; and determine if the video file is synthetic based on the prediction results.

20 Claims, 7 Drawing Sheets

(56) References Cited

U.S. PATENT DOCUMENTS

| | | | |
|---|---|---|---|
| 10,819,811 B2* | 10/2020 | Lymberopoulos | H04L 67/12 |
| 2005/0130230 A1 | 6/2005 | Davalos et al. | |
| 2007/0276776 A1 | 11/2007 | Sagher et al. | |
| 2009/0287620 A1 | 11/2009 | Xu | |
| 2010/0172567 A1* | 7/2010 | Prokoski | A61B 5/0064 |
| | | | 348/47 |
| 2010/0182501 A1* | 7/2010 | Sato | H04N 21/4312 |
| | | | 348/E7.003 |
| 2010/0202681 A1* | 8/2010 | Ai | G06V 40/165 |
| | | | 382/159 |
| 2013/0015946 A1* | 1/2013 | Lau | G06V 40/172 |
| | | | 340/5.2 |
| 2013/0289756 A1 | 10/2013 | Resch et al. | |
| 2014/0129152 A1 | 5/2014 | Beer et al. | |
| 2014/0201276 A1* | 7/2014 | Lymberopoulos | H04L 67/535 |
| | | | 709/204 |
| 2015/0099987 A1 | 4/2015 | Bhatkar et al. | |
| 2015/0163345 A1 | 6/2015 | Cornaby et al. | |
| 2016/0004904 A1 | 1/2016 | Senechal et al. | |
| 2017/0011258 A1 | 1/2017 | Pitre et al. | |
| 2017/0048244 A1 | 2/2017 | Loughlin-McHugh et al. | |
| 2017/0105668 A1 | 4/2017 | el Kaliouby et al. | |
| 2017/0238860 A1* | 8/2017 | el Kaliouby | G16H 50/30 |
| 2018/0121710 A1* | 5/2018 | Leizerson | G06V 20/698 |
| 2018/0239955 A1* | 8/2018 | Rodriguez | G06V 40/171 |
| 2019/0026581 A1* | 1/2019 | Leizerson | G02B 27/0018 |
| 2020/0019776 A1* | 1/2020 | Lewis | G06Q 20/20 |

* cited by examiner

METHODS AND SYSTEMS FOR DETECTING DEEPFAKES

CROSS-REFERENCE TO RELATED APPLICATIONS

This is a divisional of U.S. patent application Ser. No. 16/689,580, filed Nov. 20, 2019, which claims priority to U.S. Provisional Patent Application No. 62/883,957, filed Aug. 7, 2019, which are incorporated by reference in their entireties.

BACKGROUND

As machine learning techniques become more mainstream and accessible to the public, the possibility of negative consequences arises. One such example is the phenomena of deepfakes. The term "deepfake" comes from the combination of "deep learning" and "fake", as it uses deep learning techniques and neural networks to create fake content, replacing the face of a person in an image or video with the face of another person. In some cases, audio may be added and the person may be made to look like they are saying things that they never said. Early in their lifetime, deepfakes were primarily used on various social media networks to create funny videos or fake pornographic videos.

However, due to the relatively low cost and technical ability required to create a deepfake, their prominence has grown tremendously, as has their quality. This is threatening to cause serious harm in regards to politics, and other areas, as well. The possibility of fake videos on the internet of candidates running for government positions saying harmful things or the possibility of using fake videos to blackmail others has created a significant problem for social media companies, especially in the wake of elections.

Many social media companies are motivated to prevent, detect, respond, and recover from security threats as they manifest on their respective social media platforms. It is in their best interest to be able to detect deepfake videos and block them from appearing on their platforms. However, deepfake detection has stumped nearly everyone in the industry since their arrival.

Deepfakes are typically generated with various types of convolutional neural networks, due to their proclivity to work well with images. Types of these networks can include generative adversarial networks (GANs), various autoencoders, or a combination of the two. Autoencoders, in relation to deepfakes, involve training a network to recreate a specific image, then using the network to recreate a separate image based on the recreation methods for the original image. GANs involve two separate neural networks that compete against each other, and this contributes to the difficulty of detecting deepfakes. One of the networks (the generator) tries to create fake videos or images that will trick the other network (the discriminator), while the discriminator tries to detect fake videos or images created by the generator. Because of this, both networks learn and improve. So while deepfake detection may theoretically improve in increments at times, this may cause the deepfake generation to also improve.

Various attempts have been recorded at developing a robust deepfake detection methodology, yet few, if any, have been deemed a success. To provide context, in 2018, 902 papers on GANs were uploaded to arXiv. In contrast, during that same time period, only 25 papers on deep learning methods for detecting tampered and synthetic imagery were published, including non-peer reviewed papers.

Some previously explored detection methodologies include signal level detection (sensor noise, CFA interpolation, double JPEG compression, etc.), physical level detection (lighting conditions, shadows, reflections, etc.), semantic level detection (consistency of metadata), and some physiological signal detection such as breathing and blinking.

Nearly all attempted techniques for deepfake detection involve strong classifier: a network or classifier that is trained to be well-correlated with true classification, meaning the network is trained to learn to directly classify. In the case of deepfake, this would involve a single classifier that attempts to classify a video or image as "real" or "fake". This is in contrast to a weak classifier, or weakly supervised learning. A weak classifier is a neural network trained to analyze and detect certain characteristics. However, these characteristics and resulting determinations, by themselves, may only loosely predict true classification. In some cases, a weak classifier may be only slightly better at predicting a classification than a random choice.

SUMMARY OF THE INVENTION

Embodiments of the present disclosure relate to systems and methods of detecting synthetic videos. According to one aspect of the present disclosure, a system for detecting synthetic videos may include a server, a plurality of weak classifiers, and a strong classifier. The server may be configured to receive a prediction result from each of a plurality of weak classifiers; and send the prediction results from each of the plurality of weak classifiers to a strong classifier. The plurality of weak classifiers may be trained on real videos and known synthetic videos to analyze a distinct characteristic of a video file; detect irregularities of the distinct characteristic; generate a prediction result associated with the distinct characteristic, wherein the prediction result is a prediction on whether the video file is synthetic; and output the prediction result to the server. The strong classifier may be trained to receive the prediction result of each of the plurality of weak classifiers from the server; analyze the prediction result from each of the plurality of weak classifiers; and determine if the video file is synthetic based on the prediction results.

In some embodiments, the prediction result may be a numerical confidence level. In some embodiments, the known synthetic videos used to train the plurality of weak classifiers have had blurry frames removed. In some embodiments, a first weak classifier may be trained to detect a mouth in the video file; extract the mouth from the video file; detect irregularities of the mouth, wherein irregularities may be associated with teeth or facial hair; and generate a first prediction result based on the irregularities. In some embodiments, extracting the mouth from the video file may include down-sampling the mouth.

In some embodiments, extracting the mouth from the video file may include extracting a pre-defined number of frames from the video file in which a mouth has been detected; extracting a mouth from each extracted frame; generating the first prediction result based on the mouth in each extracted frame; and generating an average prediction result from the generated first prediction results. In some embodiments, a second weak classifier may be trained to detect movement of a head in the video file; calculate a pulse based on the detected movement; detect irregularities of the pulse; and generate a second prediction result associated with the irregularities of the pulse. In some embodiments, calculating the pulse based on the detected movement may include identifying a plurality of features of the head; decomposing trajectories of each feature into a set of component motions; determining a component that best corresponds to a heartbeat based on its temporal frequency; identifying peaks associated with the determined component; and calculating the pulse based on the peaks. In some embodiments, a third weak classifier may be trained to detect irregularities in audio gain of the video file.

According to another aspect of the present disclosure, a method for detecting synthetic videos may include monitoring, by a server, a digital media source; identifying, by the server, a video on the digital media source; extracting, by the server, the video; analyzing, by the server, the video with a plurality of weak classifiers; and analyzing, by the server, the prediction result of each of the plurality of weak classifiers with a strong classifier. Each weak classifier may be trained to detect irregularities of a distinct characteristic of the video; and generate a prediction result associated with the distinct characteristic, wherein the prediction result is a prediction on whether the video is synthetic. The strong classifier may be trained to determine if the video is synthetic based on the prediction results generated by each of the weak classifiers.

In some embodiments, each weak classifier of the plurality of weak classifiers may be trained on real videos and known synthetic videos. In some embodiments, the known synthetic videos used to train the plurality of weak classifiers may have had blurry frames removed. In some embodiments, a first weak classifier may be trained to detect a mouth in the video; extract the mouth from the video; detect irregularities of the mouth, wherein irregularities may be associated with teeth or facial hair; and generate a first prediction result based on the irregularities. In some embodiments, extracting the mouth from the video may include down-sampling the mouth. In some embodiments, extracting the mouth from the video may include extracting a pre-defined number of frames from the video in which a mouth has been detected; extracting a mouth from each extracted frame; generating the first prediction result based on the mouth in each extracted frame; and generating an average prediction result from the generated first prediction results.

In some embodiments, a second weak classifier may be trained to detect movement of a head in the video; calculate a pulse based on the detected movement; detect irregularities of the pulse; and generate a second prediction result associated with the irregularities of the pulse. In some embodiments, calculating the pulse based on the detected movement may include identifying a plurality of features of the head; decomposing trajectories of each feature into a set of component motions; determining a component that best corresponds to a heartbeat based on its temporal frequency; identifying peaks associated with the determined component; and calculating the pulse based on the peaks. In some embodiments, a third weak classifier may be trained to detect irregularities in audio gain of the video. In some embodiments, the prediction result may be a numerical confidence level.

According to another aspect of the present disclosure, a method of training a set of weak classifiers to detect synthetic videos may include creating, by one or more processors, a training set, wherein the training set comprises a first plurality of videos known to be real and a second plurality of videos known to be synthetic; removing, by the one or more processors, blurred frames from each video in the training set known to be synthetic; identifying, by the one or more processors, a physical feature in each video of the training set; extracting, by the one or more processors, the physical feature from each video of the training set; down-sampling, by the one or more processors, the extracted physical feature in at least one frame; and training, by the one or more processors, a first weak classifier to, based on the physical features and the down-sampled physical features, predict whether a test video is synthetic. The method may not include up-sampling.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION OF SEVERAL EMBODIMENTS

The following detailed description is merely exemplary in nature and is not intended to limit the invention or the applications of its use.

Embodiments of the present disclosure relate to systems and methods for detecting deepfakes using a series of weak classifiers (i.e. weak detectors, weakly supervised learning models, weak learners, weak predictors, etc.). This method may utilize a method the same or as similar to ensemble learning. In some embodiments, the plurality of weak classifiers may be weighted to make a final classification of interest; in relation to the present disclosure, the final classification may be whether or not an input video is "real" or "fake". In some embodiments, a strong classifier may use the weak classifier's classifications as inputs. Each weak classifier may employ weakly supervised learning models trained to detect various characteristics of an image or video. These weak classifiers may include, but are not limited to, a mouth detector, an eye detector, a skin detector, a pulse detector, and an audio detector. In some embodiments, there may be multiple audio detectors that are trained to analyze different aspects of the audio track (e.g. the gain). In some embodiments, a strong classifier (i.e. strong detector, strongly supervised learning model, strong learner, etc.) may use the outputs of the series of weak classifiers to determine if a video or image is real or fake. In the context of the present disclosure, the term deepfake is taken to mean any video with synthetic human appearances, sounds, or images made to look real. Examples may include, but are not limited to, face swaps and videos where a person is made to look like they are saying something fake. Deepfakes will be referred to herein as synthetic videos.

Figure 1:
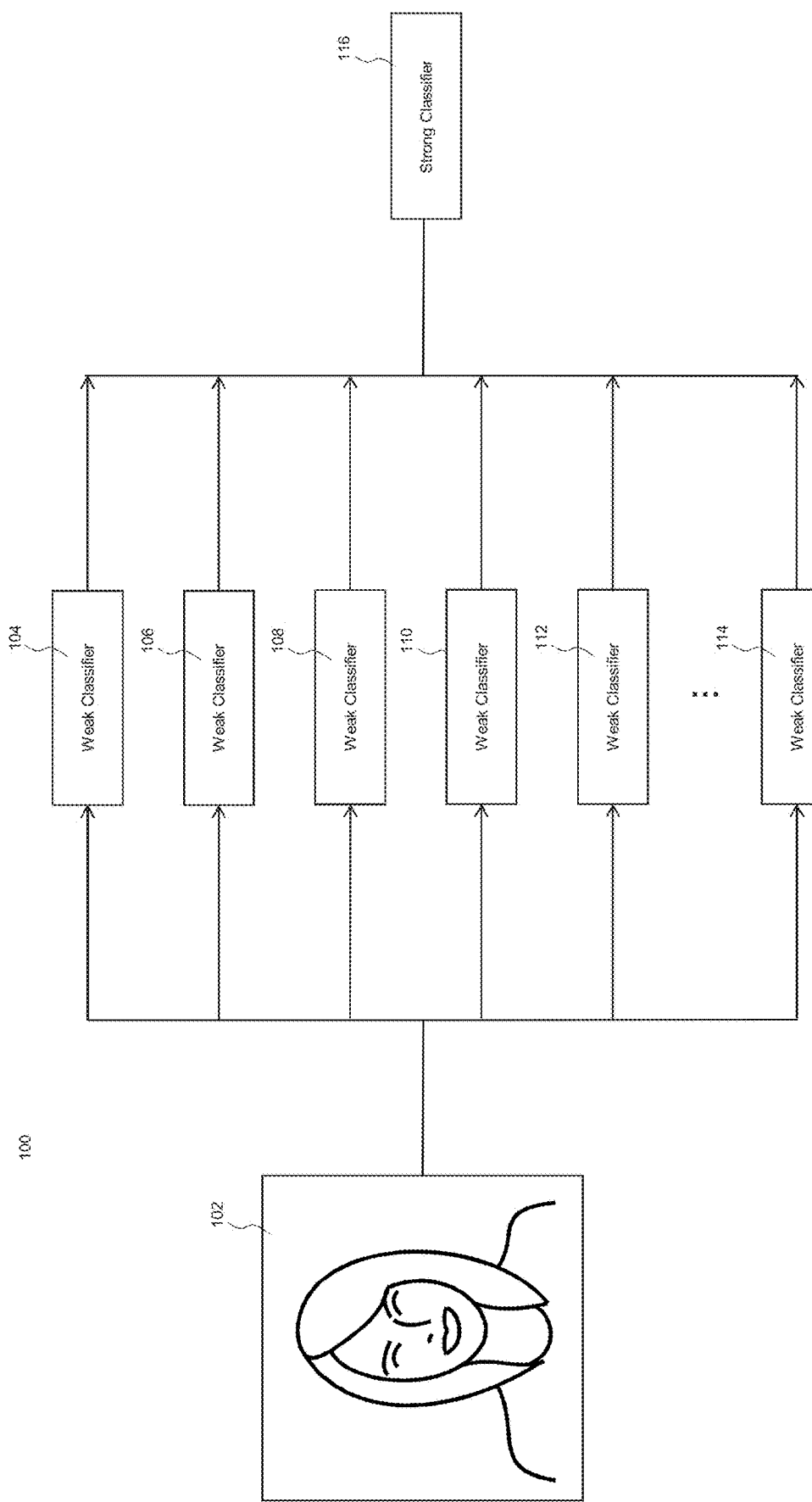
FIG. 1 is a visualization of example processing that may occur to detect a deepfake, according to some embodiments of the present disclosure.

FIG. 1 is a visualization of the process 100 that may occur to detect a deepfake, according to some embodiments of the present disclosure. Image 102 may be a frame of a video, or may generally represent a video stream or file. Image 102 proceeds to be analyzed by a plurality of weak classifiers 104-114. A weak classifier may also be referred to as a sub-classifier. Each weak classifier 104-114 may be trained to detect separate characteristics of image 102. In some embodiments, each weak classifier 104-114 may be trained with a database of videos known to be deepfakes and videos known to be real. In some embodiments, videos used to train the weak classifiers may be obtained from YouTube or other online video sources. In some embodiments, the weak classifiers 104-114 may be trained with a video known to be a deepfake and the original "real" version of the deepfake. In some embodiments, each weak classifier 104-114 may be trained with the same dataset, but may be trained to focus on specific characteristics of the image 102. In some embodiments, the weak classifiers 104-114 may be trained only on clear frames (not blurry frames) from known deepfake videos. This may prevent the weak classifiers 104-114 from associating low resolution frames or blurred frames with deepfakes. Blurry frames may be removed from a video stream manually or via standard blur removal algorithms/techniques In some embodiments, the weak classifiers 104-114 may be trained using down-sampled characteristics of a face. In some embodiments, up-sampled frames may be removed from the training database; this may preserve "original" information and help improve accuracy of the weak classifiers. In some embodiments, at least one of the plurality of weak classifiers 104-114 may employ a detection method that includes extracting the first 100 frames with a face and averaging all predictions over those frames. The detection method may extract the first 200, or 50, or any pre-determined number of frames with a faces.

In some embodiments, the determinations from each weak classifier 104-114 in relation to their respective characteristics may be passed as inputs to the strong classifier 116. In some embodiments, the determination or prediction of each weak classifier 104-114 may be a confidence level (e.g. decimal between 0 and 1). Strong classifier 116 may be trained to predict a final classification on the authenticity of the input image 102 based on the determinations of each weak classifier. In some embodiments, the possible classifications for strong classifier 116 are "real" or "fake". In some embodiments, the strong classifier 116 may predict a confidence level that a video is fake, e.g. a decimal between 0 and 1. In some embodiments, strong classifier 116 may be a neural network trained with sets of videos consisting of known deepfake videos and known real videos to predict, based on the inputs/determinations from each weak classifier 104-114, whether the input image 102 is real or fake. In some embodiments, the strong classifier 116 may weigh or adaptively weigh the determinations from each weak classifier 104-114 in order to learn to predict whether a video is real or fake.

In some embodiments, weak classifier 104 may be trained to analyze the mouth of input image 102. By definition, deepfakes alter the target's mouth. If a deepfake is generated to make a person look like they are saying something fake, or something they have never said themselves, this will inherently change the mouth of the person in the video. Facial hair, particularly immediately around the mouth, may not transfer well from a source video to a target video (from source to deepfake). Thus, weak classifier 104 may be trained to detect irregularities in the facial hair surrounding mouths. The training set, as described earlier, may be trained on a set of videos, comprising videos known to be deepfakes and videos known to be genuine. In some embodiments, weak classifier 104 may be trained to detect irregularities in the teeth of the face of input image 102. In many deepfake generation techniques, similar to facial hair surrounding a mouth, the teeth of the target may not transfer well from a source video to an end product deepfake. Thus, weak classifier 104 may be trained to detect irregularities in the teeth of the input image 102. Examples of teeth in a source video and corresponding deepfake are shown in FIGS. 3A-3B. Weak classifier 104 may output whether or not irregularities of the mouth were detected to strong classifier 116.

In some embodiments, weak classifier 106 may be trained to detect irregularities in pulse. In some embodiments, pulse detection may be performed according to techniques disclosed in "Detecting Pulse from Head Motions in Video" et al. Balakrishnan, 2013, which is herein incorporated by reference in its entirety. Balakrishnan teaches a method for measuring the pulse of an individual in a video; due to the Newtonian reaction to the influx of blood at each beat, subtle motions of the head occur. The technique detects motion of the head, then decomposes the trajectories of features of the head into a set of component motions, chooses the component that best corresponds to heartbeats based on its temporal frequency, and identifies the peaks of this motion, wherein the peaks correspond to beats. These techniques may be incorporated into weak classifier 106; weak classifier 106 may be trained to detect and, in some embodiments, calculate a pulse for a person in input image 102. Weak classifier 106 may be trained to detect irregularities based on these determined pulses, and may output whether or not irregularities of the pulse were detected to strong classifier 116.

In some embodiments, weak classifiers 108-114 may each be trained to analyze on different characteristics of a video and detect irregularities. Process 100 may include a weak classifier 108 trained to detect irregularities and make predictions based on the eyes of a face in input image 102. In some embodiments, process 100 may include a weak classifier 110 trained to detect irregularities and make predictions based on the skin of a face in input image 102. In some embodiments, process 100 may include a weak classifier 112 trained to detect irregularities and make predictions based on the audio track of input image 102. For example, weak classifier 112 may be trained to detect irregularities in the gain. In some embodiments, the background audio may be stripped to isolate the voice and weak classifier 112 may analyze the voice, in some cases to detect gain.

Figure 2:
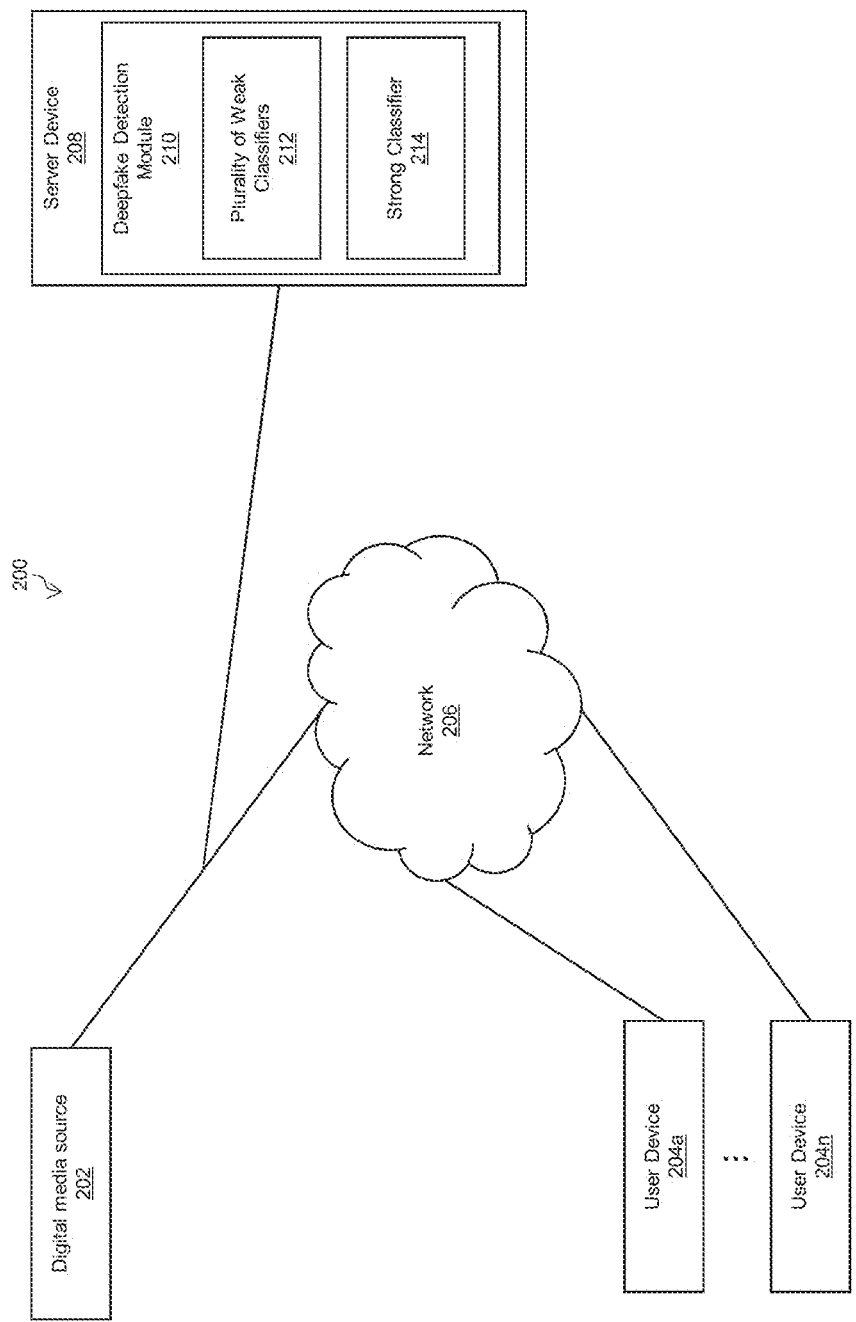
FIG. 2 is a block diagram of an example system for detecting a deepfake, according to some embodiments of the present disclosure.

FIG. 2 is a block diagram of an example system 200 for detecting a deepfake, according to some embodiments of the present disclosure. In some embodiments, process 100 of FIG. 1 may be performed within the architecture of system 200. System 200 may include user devices 204a-n (204 generally) that are connected to a digital media source 202 via network 206. Server device 208 may be communicably coupled to digital media source 202 via network 206.

Digital media source 202 may be the dark web or a form of social media network, including, but not limited to, Facebook, Instagram, Twitter, Google+, YouTube, Pinterest, Tumblr, etc. User devices 204 may be configured to upload video (or other multimedia content) via network 206 to digital media source 202. Server device 208 may be configured to intercept, test, or interact with videos uploaded to the dark web or to a social media network. Server device 208 may be configured to predict whether a video attempting to be uploaded to digital media source 202 is real or fake. In some embodiments, server device may include deepfake detection module 210, which may perform analysis similar to or the same as process 100 of FIG. 1.

Deepfake detection module 210 may include a plurality of weak classifiers 212 and a strong classifier 214. In some embodiments, a video uploaded to digital media source 202 by user device 204 via network 206 may be analyzed by the plurality of weak classifiers 212 in a fashion similar to or the same as process 100. Strong classifier 214 may be configured to receive determinations or results from the plurality of weak classifiers 212 and predict whether the video file is real or fake. In some embodiments, strong classifier 214 may learn weights for each determinations of each weak classifier.

Device 204 may include one or more computing devices capable of receiving user input as well as transmitting and/or receiving data via network 206 or communicating with server device 208. In some embodiments, user device 204 may include a conventional computer system, such as a desktop or laptop computer. Alternatively, user device 204 may include a device having computer functionality, such as a personal digital assistant (PDA), a mobile telephone, a smartphone, or other suitable device. User device 204 may be configured to send documents via network 206 to server device 208. In some embodiments, user device 204 may also be configured to receive encrypted information and display an electronic version of the originally uploaded document with values that have been extracted from the original document.

Network 206 may include one or more wide area networks (WANs), metropolitan area networks (MANs), local area networks (LANs), personal area networks (PANs), or any combination of these networks. Network 206 may include a combination of one or more types of networks such as Internet, intranet, Ethernet, twisted-pair, coaxial cable, fiber optic, cellular, satellite, IEEE 8011.11, terrestrial, and/or other types of wired or wireless networks. Network 206 may also use standard communication technologies and/or protocols.

Server device 208 may include any combination of one or more web servers, mainframe computers, general-purpose computers, personal computers, or other types of computing devices. Server device 208 may represent distributed servers that are remotely located and communicate over a communications network, or over a dedicated network such as a local area network (LAN). Server device 208 may also include one or more back-end servers for carrying out one or more aspects of the present disclosure. In some embodiments, server device 208 may be the same as or similar to device 400 described below in the context of FIG. 4.

Figure 3:
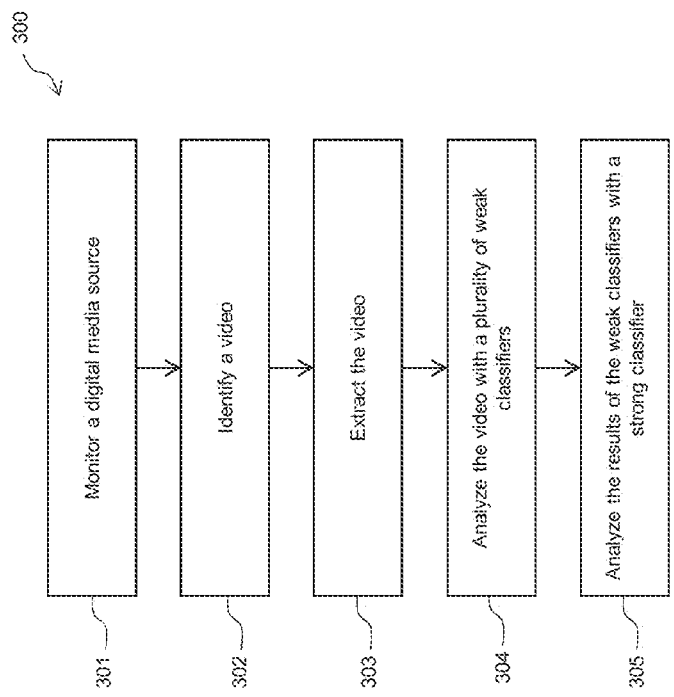
FIG. 3 is a flowchart showing a process for identifying synthetic videos that may occur within FIGS. 1 and 2, according to some embodiments of the present disclosure.

FIG. 3 is a flowchart showing a process 300 for identifying synthetic videos that may occur within FIGS. 1 and 2, according to some embodiments of the present disclosure. In some embodiments, process 300 may be performed by server device 208 of system 200 in FIG. 2. At block 301, server device 208 may monitor the dark web, a social media, such as digital media source 202. In some embodiments, the social media network may be YouTube, Twitter, Facebook, or any other similar social network. In some embodiments, server device 208 may monitor a plurality of social networks. At block 302, server device 208 may identify a post (i.e. tweet, Facebook status, etc.) that contains a video. At block 303, in response to identifying a post that contains a video, server device 208 may extract the video from the post. The extraction may be performed via any standard techniques for downloading or extracting a video from a social media post.

At block 304, server device 208 may analyze the video with a plurality of weak classifiers. In some embodiments, the analysis with each weak classifier may be performed in parallel, such as in system 100 of FIG. 1. Each weak classifier may be trained to detect irregularities related to a distinct characteristic of the video. For example, one of the weak classifiers may be trained to analyze and detect irregularities related to a mouth (i.e. facial hair or teeth) within the video. A weak classifier may be trained to analyze and detect irregularities related to the audio gain of the video. A weak classifier may be trained to calculate a pulse of a person in the video and detect irregularities of the pulse. A weak classifier may be trained to analyze the eyes of a face or skin in the video. Each weak classifier may be trained with a plurality of known real videos and known synthetic videos to make predictions on the authenticity of the video based on the aforementioned characteristics. Each weak classifier may output or generate a prediction result on the authenticity of the video. In some embodiments, the prediction result may be a score or numerical decimal reflecting a confidence level of authenticity. In some embodiments, the score may be between zero and one. Additional details of the training process are discussed in relation to FIG. 4.

At block 305, server device 208 may analyze the results of the plurality of weak classifiers with a strong classifier. In some embodiments, the server device 208 may compile or assemble the prediction results (i.e. prediction scores/confidence levels/decimals) and feed the results/scores as inputs to a strong classifier. The strong classifier may be trained to predict whether the video if real or synthetic based on the results from the weak classifiers. In some embodiments, the strong classifier may generate a confidence level or score that reflects the likelihood the video is synthetic. In some embodiments, the score may be between zero and one. In some embodiments, the strong classifier may be trained with a training set of videos comprising a plurality of known real videos and known synthetic videos. The strong classifier may be trained to, based on the results of the weak classifiers, make a final classification on the authenticity of the video. The strong classifier may weigh, adaptively weigh, or learn to adapt weights associated with each result from the weak classifiers.

Figure 4:
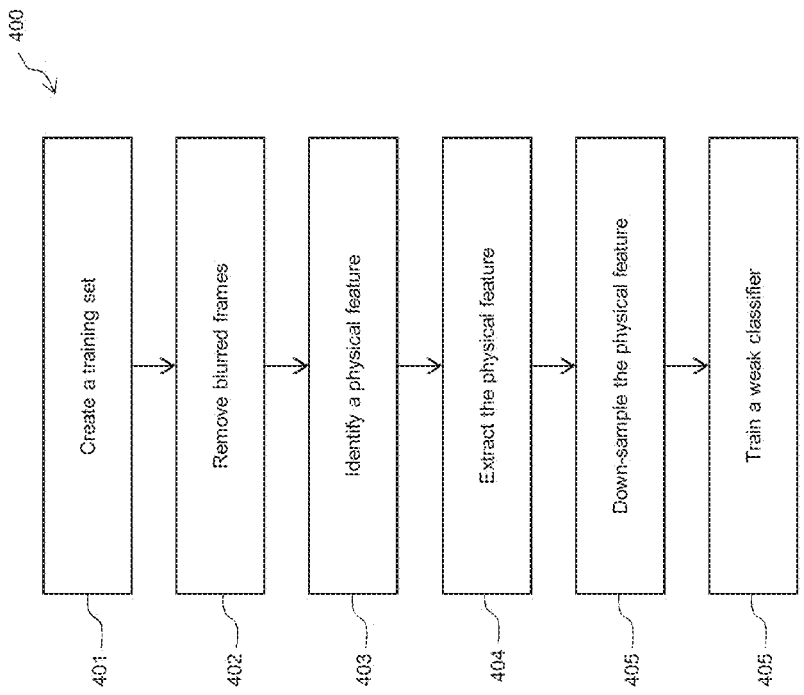
FIG. 4 is a flowchart showing a process for training a set of weak classifiers to identify synthetic videos, according to some embodiments of the present disclosure.

FIG. 4 is a flowchart showing a process 400 for training a set of weak classifiers to identify synthetic videos, according to some embodiments of the present disclosure. In some embodiments, the weak classifiers may be the plurality of weak classifiers 212 in system 200. In some embodiments, process 400 may be performed by server device 208 of system 200, although the process may also be performed by any other server device or computing device, not necessarily the same one that uses the trained classifiers. At block 401, the server may create a training set. In some embodiments, the training set may include a plurality of videos (e.g. at least fifty to one hundred videos). The plurality of videos may include both videos known to be authentic and videos known to be synthetic (i.e. known deepfakes). In some embodiments, the training set may include both real and fake versions of the same original clip. At block 402, the server may remove all blurred frames from the videos in the training set known to be synthetic. In some embodiments, this may reduce the likelihood of any classifiers associating blurriness with inauthenticity and increase the accuracy of the classifiers. The removal of blurred frames may be performed manually or by any number of known techniques for detecting blur in frames and removing them.

At block 403, the server may identify a physical feature (i.e. mouth, eyes, etc.) within each video frame of each video in the training set. This block may be performed by any number of standard object detection or image segmentation techniques. At block 404, the server may extract the identified physical feature from each frame of each video in the training set. In some embodiments, this step can be used to create multiple training sets for multiple weak classifiers (i.e. a set for a classifier to analyze a mouth and a set for a classifier to analyze eyes). At block 405, the server may down-sample the physical feature in at least one frame. In some embodiments, some videos may require down-sampling while others may not. In some embodiments, there may be no-up-sampling performed in process 400, only down-sampling. At block 405, a weak classifier is trained to, based on both the physical features and the down-sampled physical features, predict whether a test video is synthetic. In some embodiments, the prediction may include a confidence level or score, similar to the scores discussed in relation to block 305 of FIG. 3.

Figure 5A:
FIGS. 5A-5B show examples of possible irregularities in teeth generated by deepfakes.
Figure 5A:
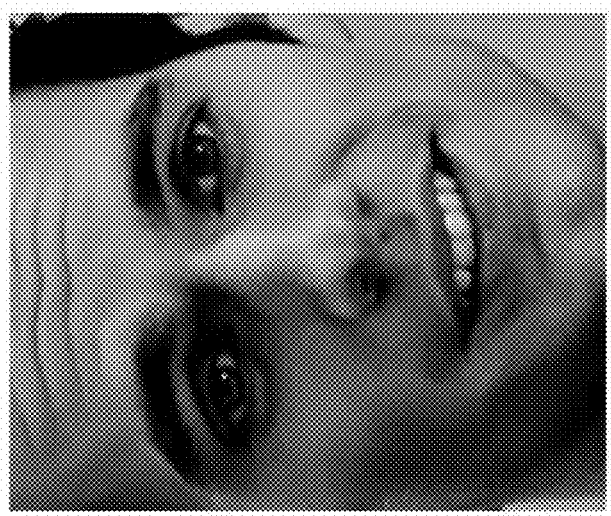
Figure 5B:

FIGS. 5A-5B show examples of possible irregularities in teeth generated by deepfakes. A face extracted from a real video is shown on the left image of FIGS. 5A and 5B. As expected in a real video of a real person, individual teeth are easily identified. The right image of FIGS. 5A and 5B are examples of a possible shortcoming of deepfake videos and may show how deepfake videos may lack in their ability to generate details of mouths; the teeth of the face in the fake video appear as just a blob, as opposed to individual teeth. In some embodiments, weak classifier 104, or any weak classifier that is trained to analyze the mouth in the context of process 100, may be trained to detect irregularities in the teeth of a face such as shown in FIGS. 5A-5B.

Figure 6:
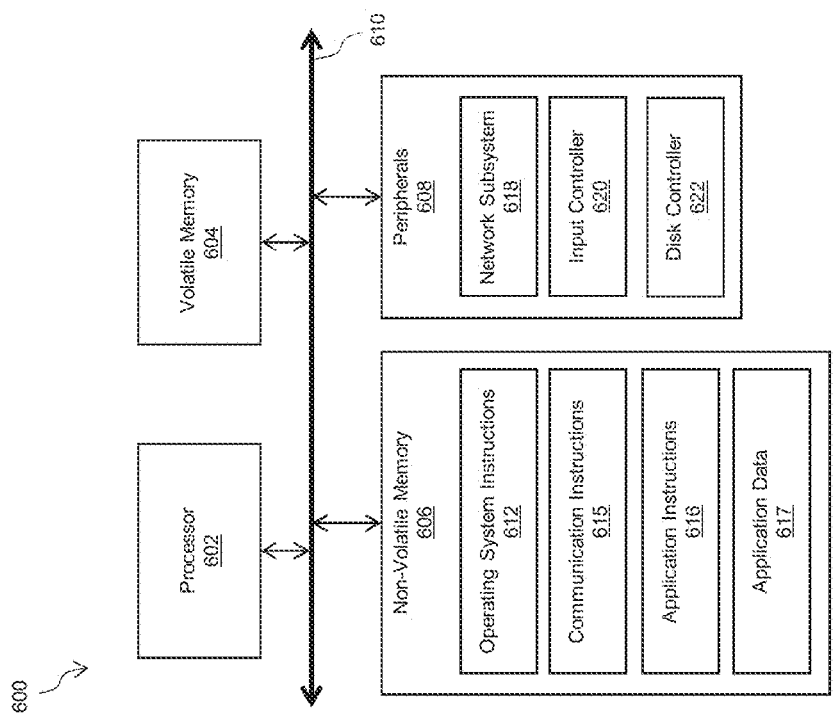
FIG. 6 is a diagram of an illustrative server device that can be used within the system of FIG. 1 or 2, according to some embodiments of the present disclosure.

FIG. 6 is a diagram of an illustrative server device 600 that can be used within system 200 of FIG. 1, according to some embodiments of the present disclosure. Server device 600 may implement various features and processes as described herein. Server device 600 may be implemented on any electronic device that runs software applications derived from complied instructions, including without limitation personal computers, servers, smart phones, media players, electronic tablets, game consoles, email devices, etc. In some implementations, server device 600 may include one or more processors 602, volatile memory 604, non-volatile memory 606, and one or more peripherals 608. These components may be interconnected by one or more computer buses 610.

Processor(s) 602 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 610 may be any known internal or external bus technology, including but not limited to ISA, EISA, PCI, PCI Express, NuBus, USB, Serial ATA, or FireWire. Volatile memory 604 may include, for example, SDRAM. Processor 602 may receive instructions and data from a read-only memory or a random access memory or both. The essential elements of a computer may include a processor for executing instructions and one or more memories for storing instructions and data.

Non-volatile memory 606 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 may store various computer instructions including operating system instructions 612, communication instructions 614, application instructions 616, and application data 617. Operating system instructions 612 may include instructions for implementing an operating system (e.g., Mac OS®, Windows®, or Linux). The operating system may be multi-user, multiprocessing, multitasking, multithreading, real-time, and the like. Communication instructions 614 may include network communications instructions, for example, software for implementing communication protocols, such as TCP/IP, HTTP, Ethernet, telephony, etc. Application instructions 616 can include instructions for detecting deepfake videos using a plurality of weak classifiers according to the systems and methods disclosed herein. For example, application instructions 616 may include instructions for components 212-214 described above in conjunction with FIG. 1.

Peripherals 608 may be included within server device 600 or operatively coupled to communicate with server device 600. Peripherals 608 may include, for example, network subsystem 618, input controller 620, and disk controller 622. Network subsystem 618 may include, for example, an Ethernet of WiFi adapter. Input controller 620 may be any known input device technology, including but not limited to a keyboard (including a virtual keyboard), mouse, track ball, and touch-sensitive pad or display. Disk controller 622 may include one or more mass storage devices for storing data files; such devices include magnetic disks, such as internal hard disks and removable disks; magneto-optical disks; and optical disks.

Methods described herein may represent processing that occurs within a system for detecting deepfake videos using a plurality of weak classifiers (e.g., process 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing illustrative embodiments, it is understood that the present disclosure has been made only by way of example, and that numerous changes in the details of implementation of the disclosed subject matter may be made without departing from the spirit and scope of the disclosed subject matter.

The invention claimed is:

1. A method of training a system to detect fake videos comprising:
    creating, by one or more processors, a training set, wherein the training set comprises a first plurality of videos known to be real and a second plurality of videos known to be fake;
    identifying, by the one or more processors, a distinct characteristic in each video of the training set;
    extracting, by the one or more processors, the distinct characteristic from each video of the training set;
    down-sampling, by the one or more processors, the extracted distinct characteristic in at least one frame; and
    training, by the one or more processors, a weak classifier to, detect irregularities of down-sampled extracted distinct characteristic and, in response to detecting the irregularities, generate a prediction result on whether a test video is fake, the prediction result being dependent on the distinct characteristic and the detected irregularities.

2. The method of claim 1 further comprising, prior to training the weak classifier, removing, by the one or more processors, blurred frames from each video in the training set known to be fake.

3. The method of claim 1 further comprising, prior to training the weak classifier, removing up-sampled frames from the training set.

4. The method of claim 1, wherein the prediction result is a numerical confidence level.

5. The method of claim 1 comprising:
    extracting a pre-defined number of frames from a video file in which the distinct characteristic has been detected;
    extracting the down-sampled distinct characteristic from each extracted frame;
    training the weak classifier to generate preliminary prediction results based on the distinct characteristic in each extracted frame; and
    training the weak classifier to generate an average prediction from the preliminary prediction results.

6. The method of claim 1, wherein the distinct characteristic comprises movement of a head, wherein training the weak classifier comprises training the weak classifier to:
    detect the movement of the head in a video file;
    calculate a pulse based on the detected movement;
    detect irregularities of the pulse; and
    generate the prediction result associated with the irregularities of the pulse.

7. The method of claim 6, wherein calculating the pulse based on the detected movement comprises:
    identifying a plurality of features of the head;
    decomposing trajectories of each feature into a set of component motions;
    determining a component that best corresponds to a heartbeat based on its temporal frequency;
    identifying peaks associated with the determined component; and
    calculating the pulse based on the peaks.

8. The method of claim 1, wherein the distinct characteristic comprises a mouth, wherein training the weak classifier comprises training the weak classifier to:
    detect the mouth in a video file;
    extract the mouth from the video file;
    detect irregularities of the mouth; and
    generate the prediction result based on the irregularities.

9. The method of claim 8, wherein the irregularities are associated with at least one of teeth or facial hair.

10. The method of claim 1, wherein the distinct characteristic comprises audio gain, wherein training the weak classifier comprises training the weak classifier to detect irregularities in the audio gain.

11. The method of claim 10, wherein training the weak classifier to detect irregularities in the audio gain comprises:
    stripping background audio from a video file;
    isolating a voice in the video file; and
    training the weak classifier to detect irregularities based on the audio gain.

12. The method of claim 1, wherein the weak classifier is a first weak classifier trained to, based on a first distinct characteristic and a down-sampled first distinct characteristic, generate a first prediction result on whether the test video is fake, further comprising training, by the one or more processors, a second weak classifier to, based on a second distinct characteristic and a down-sampled second distinct characteristic, generate a second prediction result on whether the test video is fake.

13. The method of claim 12 comprising training, by the one or more processors, a strong classifier to determine if the test video is fake based on the first and second prediction results.

14. The method of claim 13, wherein training the strong classifier comprises training the strong classifier to learn weights for each prediction result.

15. A system for training classifiers to detect fake videos comprising:
 a database comprising a training set, wherein the training set comprises a first plurality of videos known to be real and a second plurality of videos known to be fake; and
 a server communicably coupled to the database and configured to, via one or more processors: identify, by the one or more processors, a distinct characteristic in each video of the training set;
 extract, by the one or more processors, the distinct characteristic from each video of the training set;
 down-sample, by the one or more processors, the extracted distinct characteristic in at least one frame; and
 train, by the one or more processors, a weak classifier to, detect irregularities of the extracted distinct characteristic and, in response to detecting the irregularities of down-sampled extracted, generate a prediction result on whether a test video is fake, the prediction result being dependent on the distinct characteristic and the detected irregularities.

16. The system of claim 15, wherein the weak classifier is a first weak classifier trained to, based on a first distinct characteristic and a down-sampled first distinct characteristic, generate a first prediction result on whether the test video is fake, wherein the server is further configured to train, by the one or more processors, a second weak classifier to, based on a second distinct characteristic and a down-sampled second distinct characteristic, generate a second prediction result on whether the test video is fake.

17. The system of claim 16, wherein the server is further configured to train, by the one or more processors, a strong classifier to determine if the test video is fake based on the first and second prediction results.

18. The system of claim 17, wherein training the strong classifier comprises training the strong classifier to learn weights for each prediction result.

19. The system of claim 15, wherein the server is configured to, prior to training the weak classifier, remove, by the one or more processors, blurred frames from each video in the training set known to be fake.

20. The system of claim 15, wherein the server is configured to, prior to training the weak classifier, remove up-sampled frames from the training set.

* * * * *